United States Patent [19]
Stewart et al.

[11] Patent Number: 5,971,686
[45] Date of Patent: Oct. 26, 1999

[54] RETAINED FASTENER

[75] Inventors: Robert E. Stewart, Farmington Hills; Carl Lewis, Sterling Heights, both of Mich.

[73] Assignee: MSD Stamping, Inc., Livonia, Mich.

[21] Appl. No.: 09/107,735

[22] Filed: Jun. 30, 1998

Related U.S. Application Data

[60] Provisional application No. 60/052,770, Jul. 2, 1997.

[51] Int. Cl.[6] .............................. F16B 39/10; F16B 37/04
[52] U.S. Cl. ........................... 411/120; 411/113; 411/181
[58] Field of Search .................................. 411/119, 120, 411/121, 111, 112, 113, 176, 180, 181, 183; 29/505, 509, 243.5, 283.5

[56] References Cited

U.S. PATENT DOCUMENTS

| | | | |
|---|---|---|---|
| 716,018 | 12/1992 | Feher | 411/120 |
| 2,401,824 | 6/1946 | Gladden | 411/113 |
| 3,496,980 | 2/1970 | Steward | 411/112 |
| 3,738,406 | 6/1973 | Williams | 411/112 |
| 4,722,647 | 2/1988 | Sawdon | 411/180 |

*Primary Examiner*—Flemming Saether
*Attorney, Agent, or Firm*—Howard & Howard

[57] ABSTRACT

A fastener assembly and a method for making the same wherein a non-fanged fastener is affixed to a retainer by the interaction of a tab and a stake. The fastener assembly preferably includes a retainer having a face with an opening and a tab positioned adjacent to the opening. The tab protrudes from the face and extends over the fastener. A staking die forms a stake which extends into engagement with the retainer such that the fastener is retained to the retainer by the interaction of the tab and the stake.

9 Claims, 3 Drawing Sheets

RETAINED FASTENER

This application claims a priority to a provisional application filed on Jun. 2, 1997, application Ser. No. 60/052,770.

BACKGROUND OF THE INVENTION

The present invention generally relates to a fastener assembly, and more particularly to a flangless fastener and a retainer having tabs wherein the fastener is affixed to the retainer by the interaction of the tabs and a stake which engages the retainer.

Fastener assemblies provide manufacturing advantages unavailable to the individual combination of a nut and a bolt. Fastener assemblies having polygonal fasteners with flanges and anti-rotational retainers are commonly known, see U.S. Pat. No. 3,496,980. Typically, these flanged fasteners are inserted through an opening in the retainer with the flange engaging one side of the retainer. The head of the fastener is then staked in place by scraping material from the fastener into contact with the retainer such that the retainer is trapped between the flange and the stakes. This worked well enough for attachment of the retainer, however, not all applications allow for the usage of a flanged fastener.

Space limitations, very large fasteners, etc., can limit the ability to have a flange on the fastener. Without the flange, the fastener cannot be retained by the traditional methods.

SUMMARY OF THE INVENTION

The present invention overcomes the above problem by providing a fastener assembly which includes a retainer having a body portion with an opening and at least one tab positioned adjacent the opening. The tab protrudes from the face of the body portion and extends over the fastener. The fastener has a first surface and a second surface with a sidewall therebetween. The fastener is mounted in the opening of the retainer such that the first surface is adjacent the tab, and a stake is located in the sidewall which extends into engagement with the face. The fastener is thereby retained between the retainer and the tab by the interaction of the stake with the face and the tab engaging the first surface.

The disclosed staking die is designed to clear the tabs of the retainer while providing sufficient contact with the fastener to generate a stake sufficient to hold the retainer on the fastener. Reliefs cut into the die allow the die to be aligned rotationally with the tabs while preventing unwanted deformation. Shoulders are preferably located within the reliefs such that the shoulders press the retainer tabs against the first surface of the fastener at substantially the same time as the stakes are generated. This pressing of the tabs and staking action contribute to a secure attachment of the fastener to the retainer.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
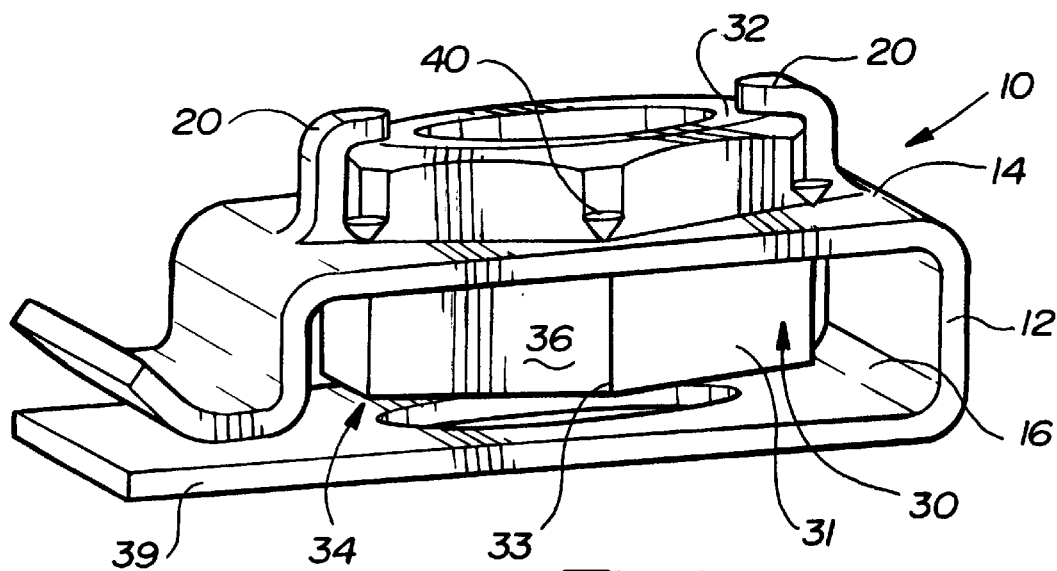
FIG. 1 a general perspective view of the fastener assembly of the present invention.

A fastener assembly 10 of the present invention is generally shown in FIG. 1. The fastener assembly 10 includes a retainer 12 having a face 14 with an opening 16 and a tab 20 positioned adjacent the opening 16. The illustrated retainer 12 is a clip type retainer. In use, retainer 12 can be clipped over a member to allow a second member to be attached. It should be appreciated by those of ordinary skill in the art that other retainer styles can be used.

The tab 20 protrudes from the face 14 and extends over the fastener 30. The fastener 30 has a first surface 32 and a second surface 34 with a sidewall 36 therebetween. The fastener 30 is mounted in the opening 16 such that the first surface 32 is adjacent the tab 20. A stake 40 is located in the sidewall 36 and extends from the sidewall 36 into engagement with the face 14 such that the fastener 30 is retained between the retainer 12 and the tab 20 by the interaction of the stake 40 with the face 14. In the preferred embodiment, the fastener 30 has flats 31 which join at points 33. The opening 16 is configured to mate with the fastener sidewalls and in the preferred embodiment the opening has flats 35 and points 37 (see FIG. 2) to closely receive the flats 31 and points 33 of fastener 30. As should be appreciated, the retainer 12 would either have to be opened slightly to receive the fastener 30, or the fastener 30 would be installed into face 14 before the leg 39 of the retainer 12 is bent.

The fastener 30 of the present invention is preferably of standard hexagonal dimensions and of standard materials. The fastener is designated generally as 30, however it is to be understood that the present invention applies to either a male 30A or female 30B configuration.

Figure 2:
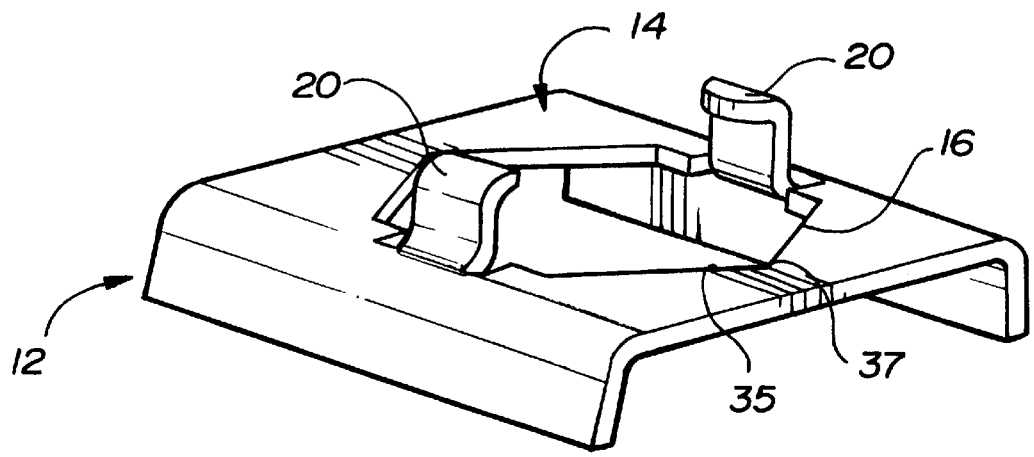
FIG. 2 is a general perspective view of a retainer having tabs.

FIG. 2 is a perspective view of a second style retainer 12. The retainer 12 is preferably formed from a strip of sheet metal. The retainer 12 has an opening 16 which is generated to allow the passage of the fastener 30 through a retainer face 14, and tabs 20. In the preferred embodiment, the retainer 12 is formed in a progressive die with the opening 16 punched from the face 14 and with the tabs 20 being left and extending into the opening. The tabs 20 are then bent to extend over the opening 16 and allow a portion of the fastener to protrude through the opening 16. The opening 16 is preferably hexagonal to allow the direct matting of a hexagonal fastener body. The opening 16 is also dimensionally smaller across the flats than the across the points of the fastener, to prevent the turning of the fastener 30 within the retainer 12 when assembled.

Figure 3:
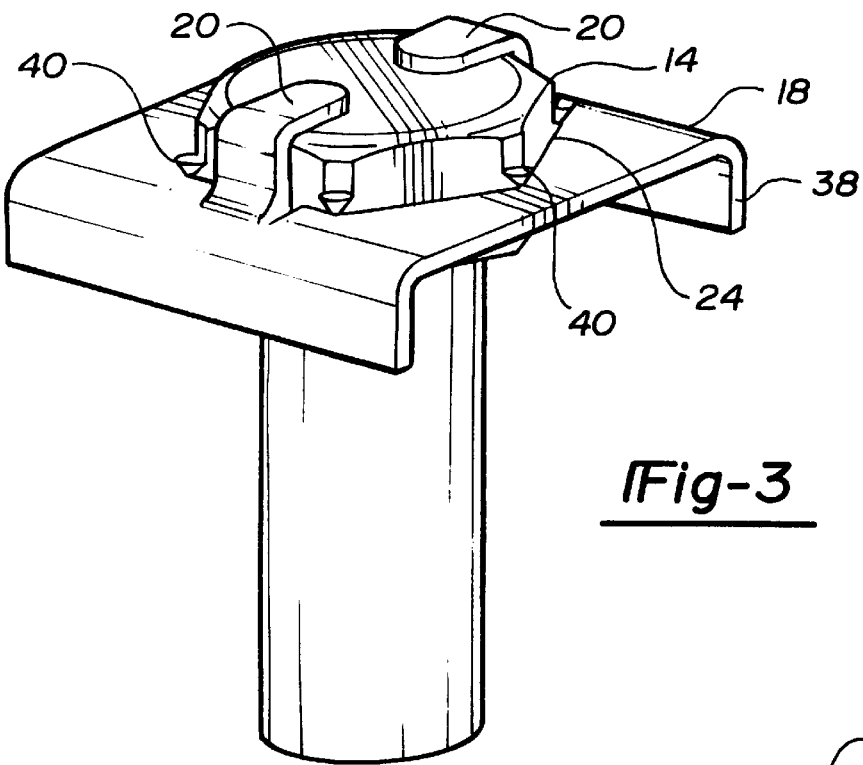
FIG. 3 is a perspective view of a stud fastener assembly of the present invention.
Figure 4:
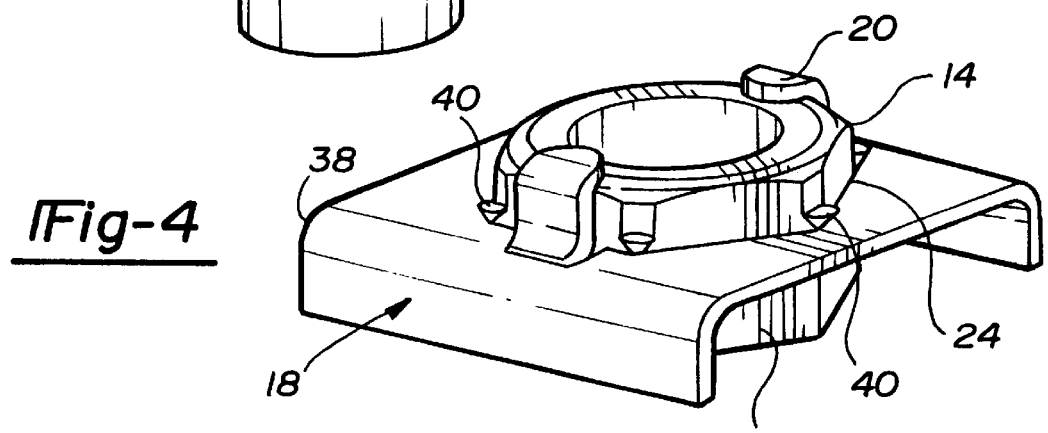
FIG. 4 is a perspective view of a nut fastener assembly of the present invention.

FIGS. 3 and FIG. 4 are general perspective views of the completed fastener assembly 10 of the present invention. FIG. 3 illustrates a male fastener 30A, and FIG. 4 illustrates a female fastener 30B. The retainer 12 includes a pair of opposed tabs 20 positioned adjacent the opening 16 to capture the fastener 30. The tabs 20 are preferably located along the first surface 32 of the fastener 30 and are of a length which does not interfere with the operation of the fastener 30. For example, as illustrated, the tabs 20 are shorter on the female fastener 30B than the male fastener 30A. As illustrated in FIGS. 3 and 4, the fastener 30 is secured to the retainer 12 by the interaction between tabs 20 and stakes 40.

Figure 5:
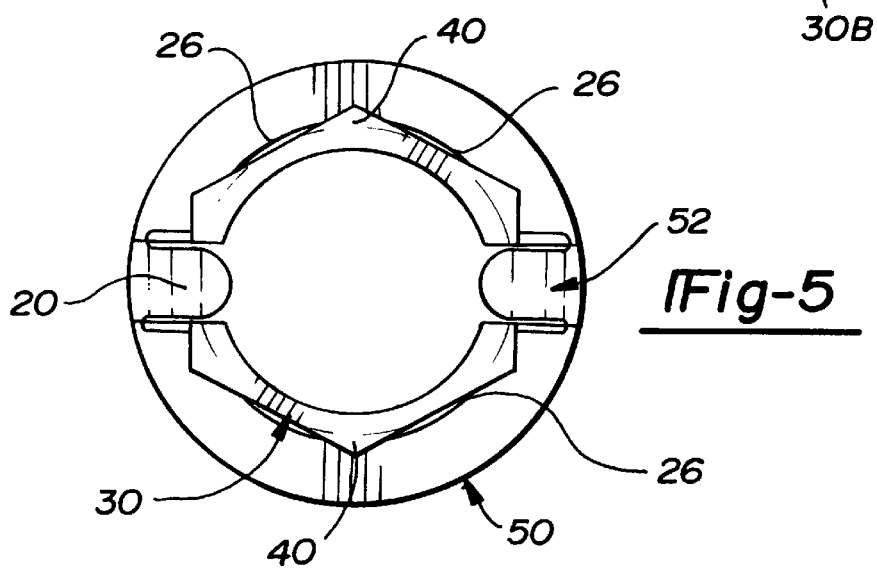
FIG. 5 is a top silhouette view of the staking die, fastener, and retainer as they appear during the staking operation.
Figure 6:
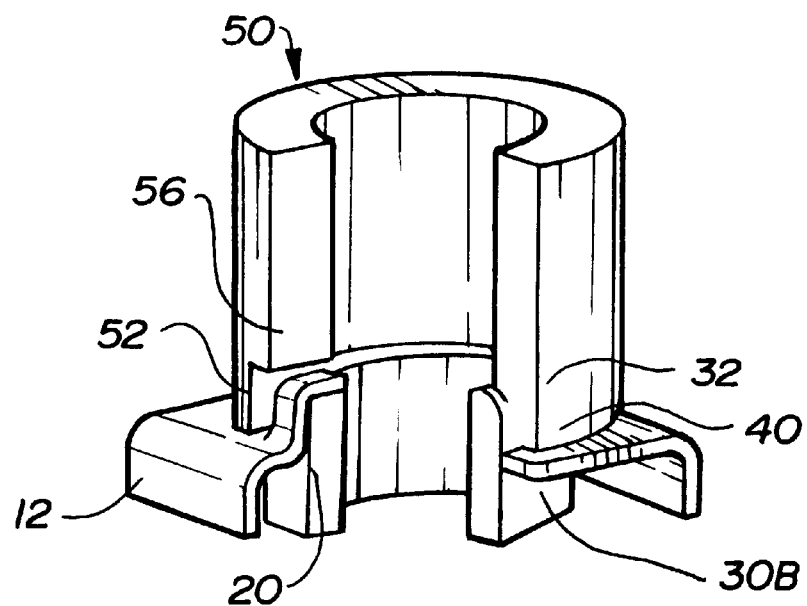
FIG. 6 is a sectional view of a staking die positioned on the fastener assembly of the present invention.
Figure 7:
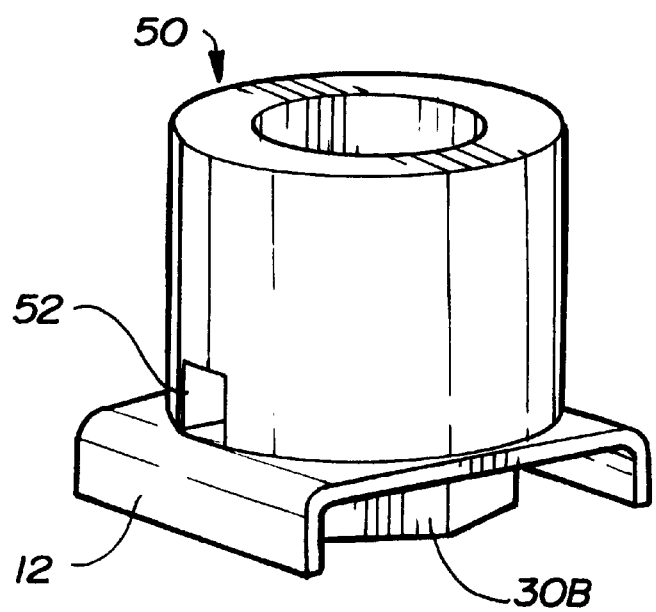
FIG. 7 overall perspective view of a staking die positioned on the fastener assembly of the present invention.

The present invention further provides a novel staking method and FIGS. 5 through 7 illustrate a staking die 50 which allows the fasteners 30 to be staked to the retainers 12. FIG. 5 provides a silhouette view of the staking die for this process in an ideal position. The die 50 is designed to clear the tabs 20 of the retainer 12, while making sufficient contact with the fastener 30 to generate adequate stakes 40 to hold the retainer 12 to the fastener 30. The hexagonal fastener 30 and the retainer 12 need only be aligned rotationally to fit the tabs 20 into the clearance area 52 of the die 50. As illustrated, the stacking die 50 has a generally circular opening 26 which deforms the points 33 of the fastener 30 to form stakes 40.

FIGS. 6 and 7 are general perspective views of the staking die 50 engaging the fastener 30 of the present invention. FIG. 6 is a sectional view and FIG. 7 is an overall perspective view of the staking die 50 applied to a nut type fastener 30. The tabs 20 are avoided by having sufficient relief 52 cut into the die 50 to provide clearance for the tales 20. To insure full engagement of the tabs 20 to the fastener 30, a shoulder 26 is preferably located in the die 50. The shoulder 26 is preferably designed such that it engages the retainer 12 and tabs 20, in a proper position on the first surface 32 of the fastener 30, at substantially the same time as the stakes 40 are generated.

The fastener 30 is held in place while the staking die 30 is forced into the fastener 30, during which time the staking surface 32 moves material from the fastener 30, towards the retainer 12, thereby generating stakes 40 sufficient enough to hold the retainer 12 on the fastener 30.

After the fastener 30 is secured to the retainer 12, the staking die 50 is removed and any further forming can be performed on the retainer 12 to ease final application of the fastener assembly 10.

It will be appreciated by those of ordinary skill in this art that the staking die 50 could be manually positioned on the fastener 30 and manually struck by an operator or staking die 50 could be installed into a press and the press could force the die 50 into engagement with the fastener 30.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A fastener assembly comprising:

a retainer having a body portion with a top surface;

said body portion having an opening and at least one tab positioned adjacent said opening;

said tab protruding from said top surface;

a fastener having a first and second surface with a sidewall therebetween, said fastener mounted in said opening such that said first surface is adjacent said tab; and a stake located in said sidewall, said stake extending from said sidewall and engaging said top surface;

whereby said fastener is retained to said retainer by the interaction of said tab with said first surface and said stake with said top surface.

2. The fastener assembly of claim 1, wherein said tab is integral with said retainer.

3. The fastener assembly of claim 1, wherein said tab extends over said fastener.

4. The fastener assembly of claim 1, wherein said second surface is spaced from and generally parallel to said face.

5. The fastener assembly of claim 1, wherein said second surface is opposite said face.

6. The fastener assembly of claim 1, wherein said fastener has a plurality of sidewalls, each of said sidewalls having a stake.

7. The fastener assembly of claim 1, wherein said fastener has a plurality of hexagonal oriented sidewalls.

8. The fastener of claim 7, wherein said opening has a plurality of hexagonal oriented surfaces which mate with said plurality of hexagonal oriented sidewalls of said fastener to prevent rotation of said fastener.

9. The fastener assembly of claim 1, wherein said opening is defined by a plurality of sides which mate with said sidewalls of said fastener.

* * * * *